United States Patent
Jung et al.

(10) Patent No.: US 10,984,302 B2
(45) Date of Patent: Apr. 20, 2021

(54) ELECTRONIC SHELF LABEL, ELECTRONIC SHELF LABEL SYSTEM, AND ELECTRONIC SHELF LABEL METHOD

(71) Applicant: LG INNOTEK CO., LTD., Seoul (KR)

(72) Inventors: Sin Young Jung, Seoul (KR); Bong Woo Kang, Seoul (KR)

(73) Assignee: ATEC AP CO., LTD., Seongnam-si (KR)

( * ) Notice: Subject to any disclaimer, the term of this patent is extended or adjusted under 35 U.S.C. 154(b) by 539 days.

(21) Appl. No.: 15/802,966

(22) Filed: Nov. 3, 2017

(65) Prior Publication Data
US 2018/0121778 A1    May 3, 2018

(30) Foreign Application Priority Data

Nov. 3, 2016   (KR) .................. 10-2016-0145980

(51) Int. Cl.
| | |
|---|---|
| G06K 19/07 | (2006.01) |
| G06K 19/077 | (2006.01) |
| G06K 7/00 | (2006.01) |
| G06K 7/10 | (2006.01) |
| G06Q 20/20 | (2012.01) |
| G06Q 30/06 | (2012.01) |
| G09F 3/20 | (2006.01) |

(52) U.S. Cl.
CPC ....... *G06K 19/0726* (2013.01); *G06K 7/0008* (2013.01); *G06K 7/10198* (2013.01); *G06K 19/0702* (2013.01); *G06K 19/0723* (2013.01); *G06K 19/07707* (2013.01); *G06Q 20/20* (2013.01); *G06Q 30/06* (2013.01); *G09F 3/208* (2013.01)

(58) Field of Classification Search
CPC .......... G06K 19/0726; G06K 19/0723; G06K 19/07707; G06K 19/0702; G06K 7/0008; G06K 7/10198; G06Q 20/20; G06Q 30/06; G09F 3/208
USPC .......................................... 705/16
See application file for complete search history.

(56) References Cited

U.S. PATENT DOCUMENTS

| | | | |
|---|---|---|---|
| 2013/0027189 A1 | 1/2013 | Karhuketo et al. | |
| 2015/0132006 A1* | 5/2015 | Inoue | F21K 9/20 398/118 |

FOREIGN PATENT DOCUMENTS

| | | |
|---|---|---|
| KR | 10-2011-0053858 A | 5/2011 |
| KR | 10-2013-0040872 A | 4/2013 |
| KR | 10-2016-0021015 A | 2/2016 |
| KR | 10-2016-0076072 A | 6/2016 |

* cited by examiner

*Primary Examiner* — Russell S Glass
(74) *Attorney, Agent, or Firm* — Saliwanchik, Lloyd & Eisenschenk

(57) ABSTRACT

Provided are an electronic shelf label, an electronic shelf label system, and an electronic shelf label method. The electronic shelf label includes a power supply unit configured to provide driving power to one or more terminals, a communication interface configured to provide a display signal to the one or more terminals, a terminal selection unit configured to select a terminal to be controlled among the one or more terminals, and a controller configured to control the terminal selection unit so as to select the terminal to be controlled and generate the display signal.

8 Claims, 11 Drawing Sheets

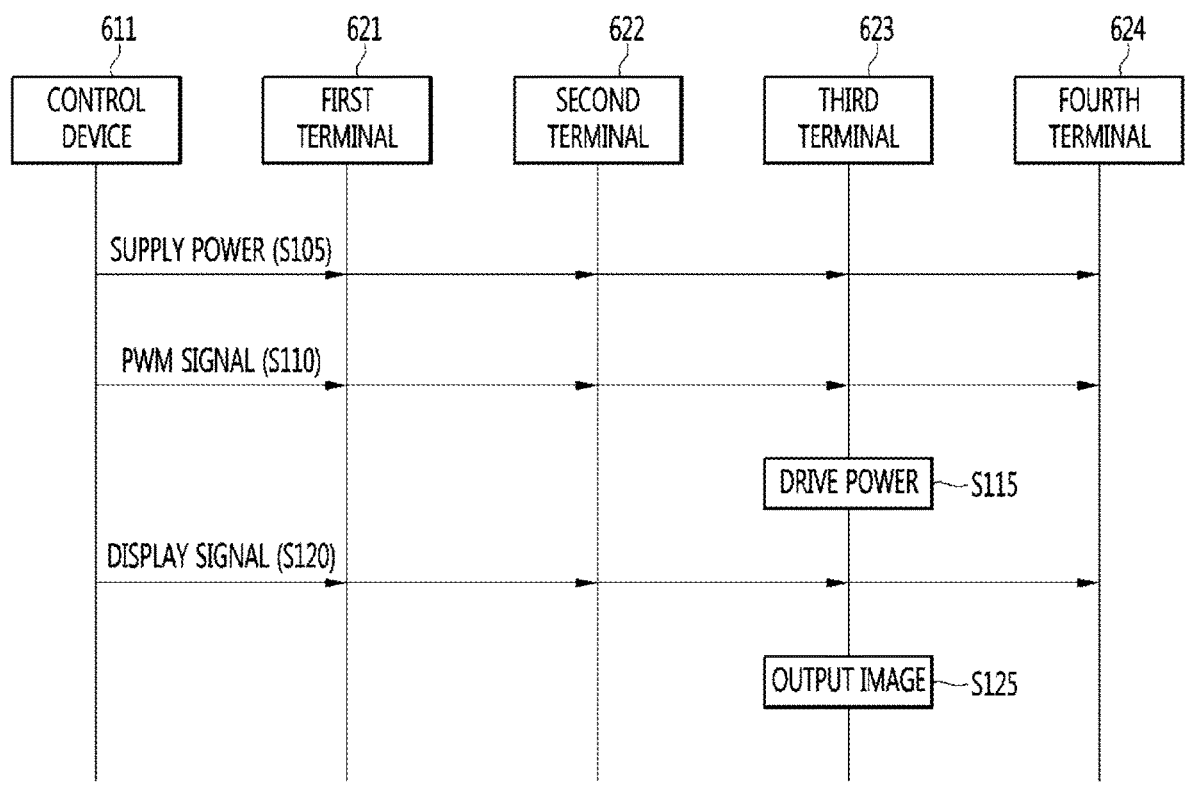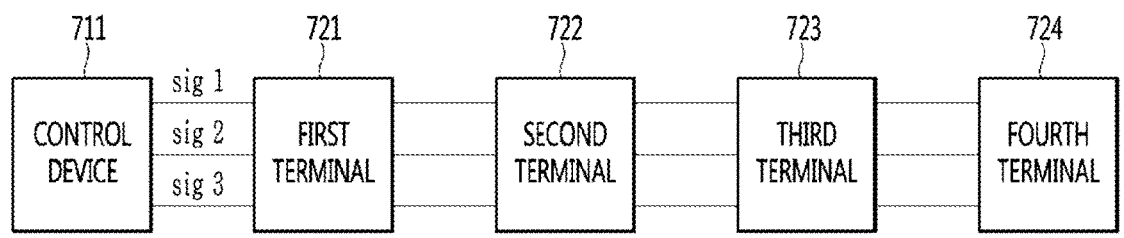

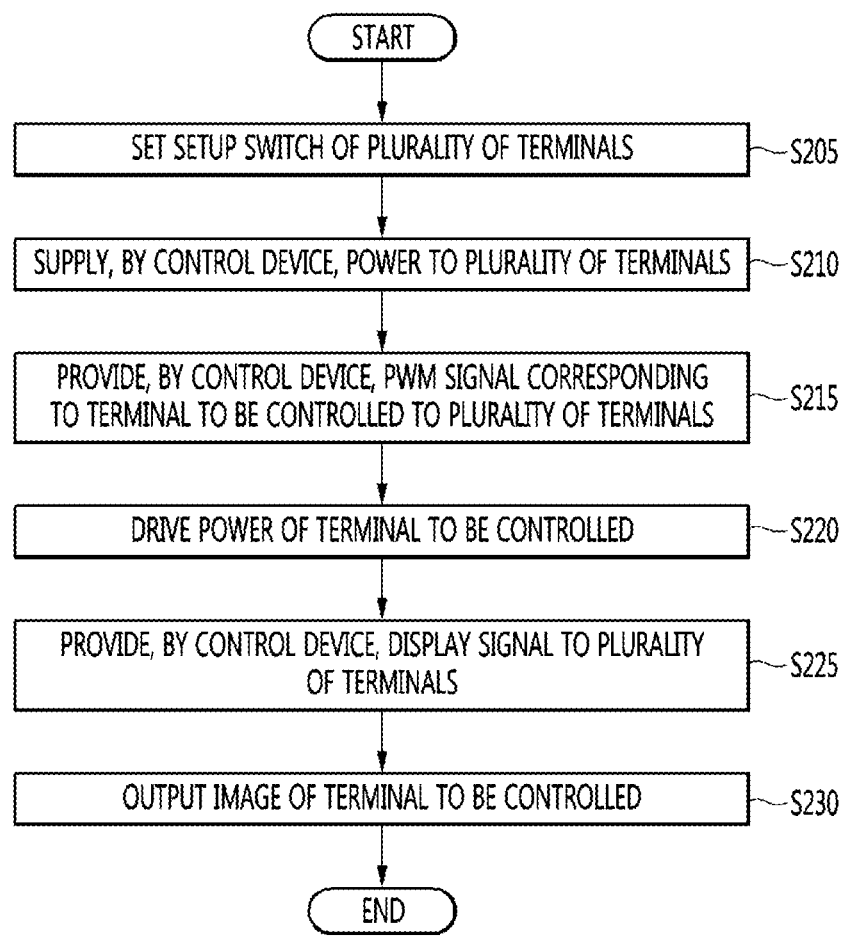

ELECTRONIC SHELF LABEL, ELECTRONIC SHELF LABEL SYSTEM, AND ELECTRONIC SHELF LABEL METHOD

CROSS-REFERENCE TO RELATED APPLICATION

This application claims priority and the benefit of Korean Patent Application No. 10-2016-0145980, filed Nov. 3, 2016, the disclosure of which is hereby incorporated by reference in its entirety.

BACKGROUND

The present disclosure relates to an electronic shelf label, an electronic shelf label system, and an electronic shelf label method.

In general, products are displayed on the shelves of distribution stores. Information such as sales price, discount, unit price, and country of origin for the products is displayed on a paper label. The paper label is discarded when the production information is changed or the product display position is changed. At this time, a new paper label must be generated so as to display the changed product information. Therefore, the paper label incurs continuous costs for maintenance. Additionally, the use of the paper label has a negative effect on environmental protection because a raw material "paper" is wasted in terms of environment.

Recently, research and development have been conducted on an electronic price indicator or an electronic shelf label as means for replacing the paper label. The electronic shelf label may be referred to as a product tag. The electronic shelf label receives price related information of a corresponding product from a central control center (server) through a wireless device (for example, a gateway) and displays the received price related information, thereby providing information on the corresponding product.

The electronic shelf label can display, in real time, frequent information changes or discount information of the product through the display of the electronic shelf label. For user convenience, the electronic shelf label can display not only price information but also a lot of information such as a store symbol, a promotion image, a barcode, a product name, a product image, information on country of origin, and the like.

Examples of the display used for the electronic shelf label include a bistable cholesteric display (BCD) and an electrophoretic display (EPD).

The electronic shelf label system is a system that interworks with a Point Of Sale (POS) device by using the electronic shelf label, guides the price information of the product, and additionally displays a variety of promotion information such as price per unit, sale price, normal price, product display position, point information, display quantity, and the like, thereby helping product purchase and store operations.

Meanwhile, the electronic shelf label provided in the electronic shelf label system continuously updates the price information or the like periodically or non-periodically. To this end, the electronic shelf label system is configured to allocate time slots to a plurality of electronic shelf label tags and perform wireless communication with the electronic shelf label server by driving only during the allocated time slots. The number of electronic shelf labels provided in the electronic shelf label system rapidly increases according to the size of a store in which the electronic shelf labels are installed. In this case, each electronic shelf label can not directly communicate with the electronic shelf label server and can perform communication via relay through a coordinator, a router, or the like.

SUMMARY

Embodiments provide an electronic shelf label, an electronic shelf label system, and an electronic shelf label method, capable of driving without micro control unit (MCU) in a plurality of electronic shelf labels.

Embodiments also provide an electronic shelf label, an electronic shelf label system, and an electronic shelf label method, capable of improving an image output speed.

Embodiments also provide an electronic shelf label, an electronic shelf label system, and an electronic shelf label method, capable of reducing a manufacturing cost.

Embodiments also provide an electronic shelf label, an electronic shelf label system, and an electronic shelf label method, capable of controlling one or more electronic shelf labels by one control device.

In one embodiment, an electronic shelf label includes: a power supply unit configured to provide driving power to one or more terminals; a communication interface configured to provide a display signal to the one or more terminals; a terminal selection unit configured to select a terminal to be controlled among the one or more terminals; and a controller configured to control the terminal selection unit so as to select the terminal to be controlled and generate the display signal.

The terminal selection unit may provide a PWM signal to the one or more terminals so as to select the terminal to be controlled.

The terminal selection unit may select the terminal to be controlled by setting a duty ratio of the PWM signal.

In another embodiment, a terminal includes: a display unit configured to output an image based on a display signal and a driving voltage provided from a control device; and a circuit unit including a driving power reception unit that generates a driving voltage based on driving power provided from the control device, and configured to provide the driving voltage to the display unit when a terminal to be controlled by the control device is selected.

The control device may select the terminal by setting a duty ratio of a pulse width modulation (PWM) signal.

The circuit unit may include: a low pass filter configured to output a DC voltage based on the PWM signal; a driving selection unit configured to output a selection voltage based on the DC voltage and one or more reference voltages; a driving switch configured to provide the driving voltage to the display unit based on the selection voltage; and a setup switch configured to transfer the selection voltage corresponding to the terminal to be controlled to the driving switch.

The low pass filter may include a resistor and a capacitor.

The driving power reception unit may further generate reference power based on the driving power, the driving selection unit may include a voltage division unit and a selection voltage generation unit, the voltage division unit may generate the one or more reference voltages by voltage division based on the reference power, and the selection voltage generation unit may generate the selection voltage based on the DC voltage and the reference voltage.

The selection voltage generation unit may include: a plurality of operational amplifiers configured to compare the DC voltage with the reference voltage, generate a high level signal when a level of the DC voltage is higher than a level of the reference voltage, and generate a low level signal when the level of the DC voltage is lower the level of the reference voltage; and a plurality of XOR gates configured to generate the selection voltage when outputs of the operational amplifiers have different levels.

The setup switch may include a plurality of switches, only the switch set to the terminal to be controlled may be turned on, and the other switches may be turned off.

The plurality of switches may be reed switches.

When the selection voltage is input, the driving switch may be turned on to provide the driving voltage to the display unit.

In another embodiment, an electronic shelf label method includes: setting a setup switch of a plurality of terminals; supplying, by a control device, power to the plurality of terminals; providing, by the control device, a PWM signal corresponding to a terminal to be controlled to the plurality of terminals; driving power of the terminal to be controlled, based on the PWM signal; providing, by the control device, a display signal to the plurality of terminals; and outputting an image in the terminal to be controlled, based on the display signal.

The details of one or more embodiments are set forth in the accompanying drawings and the description below. Other features will be apparent from the description and drawings, and from the claims.

BRIEF DESCRIPTION OF THE DRAWINGS

These and/or other aspects will become apparent and more readily appreciated from the following description of the embodiments, taken in conjunction with the accompanying drawings in which:

FIG. 6 is a signal flow diagram of a control device and a plurality of terminals, according to another embodiment;

FIG. 7 is a view illustrating a connection structure of a control device and a plurality of terminals, according to another embodiment;

FIG. 16 is a flowchart of an electronic shelf label method according to another embodiment.

DETAILED DESCRIPTION OF THE EMBODIMENTS

Figure 1:
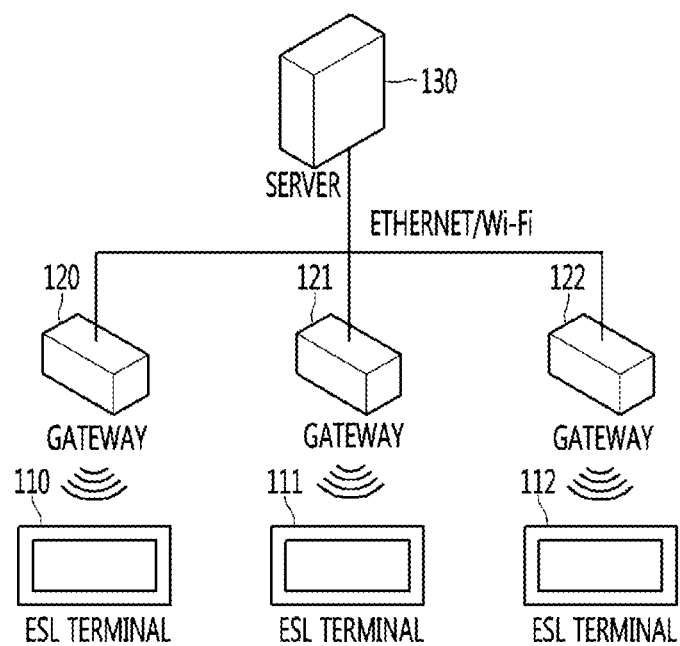
FIG. 1 is a schematic view of a system including an electronic shelf label, according to an embodiment.

Embodiments of the present disclosure will be described with reference to the accompanying drawings in such a manner that the embodiments may be easily carried out by those skilled in the art to which the present disclosure pertains. The same reference numerals are used to denote the same elements throughout the specification.

The effects and features, and methods of achieving the effects and features will become apparent from embodiments described below in detail with reference to the accompanying drawings. However, the present invention is not limited to the following embodiments and may be realized in various forms. The present embodiments are provided so that this disclosure will be thorough and complete and will fully convey the scope of the present invention to those skilled in the art. The scope of the invention should be determined by reasonable interpretation of the appended claims.

In the following descriptions of the embodiments, detailed descriptions of well-known functions or constructions will be omitted since they would obscure the invention in unnecessary detail. The terms as used herein are those general terms currently widely used in the art by taking into account functions in the present disclosure, but the terms may vary according to the intention of those of ordinary skill in the art, precedents, or the like in the art. Thus, the terms used herein should be understood based on the overall description of the present invention.

Spatially relative terms "under, below, beneath," "lower," "on, above," "upper," and the like may be used to readily describe a relationship between a device or elements and another device or elements as illustrated in the drawings. Spatially relative terms should be understood as including different directions of the elements during use or operation as well as directions shown in the drawings. For example, when inverting an element shown in the drawings, an element described as "below" or "beneath" another element may be placed "above" another element. Thus, the exemplary term "below" can include both downward and upward directions.

The terminology used herein is for the purpose of illustrating embodiments and is not intended to limit the present disclosure. As used herein, the singular form is intended to include the plural forms as well, unless context clearly indicates otherwise. It will also be understood that the terms "comprises" and/or "includes", when used herein, specify the presence of stated elements, steps, operations, and/or devices, but do not preclude the presence or addition of other elements, steps, operations, and/or devices unless otherwise defined.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagrams. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagrams. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagrams.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

FIG. 1 is a schematic view of a system including an electronic shelf label, according to an embodiment.

Referring to FIG. 1, electronic shelf labels (ESLs) 110 to 112 may also be referred to as electronic shelf label terminals, product tags, ESL terminals, terminals, or control devices. The ESLs 110 to 112 may be mounted on shelves of stores such as large-sized shopping malls and general stores and display product information such as price. The plurality of ESLs 110 to 112 communicate with a server 130 through gateways positioned around the respective ESLs among a plurality of gateways 120 to 122. Additionally, when a large number of ESLs are present, each ESL cannot directly communicate with the gateway connected to the server and can communicate via relay through a coordinate (not shown) or a router (not shown).

The server 130 is connected to a console (not shown). The console means a device including a user interface for managing the system. The server 130 may receive a user command through the console. Additionally, the gateways 120 to 122 and the ESLs 110 to 112 may receive a user command through the console. In other words, a user may control the ESLs 110 to 112, the gateways 120 to 122, and the server 130 through the console.

The server 130 may transmit, to the ESLs 110 to 112, product information to be displayed on the ESLs 110 to 112, for example, data such as a price, a product image, discount information, and a barcode. The ESLs 110 to 112 may output the data received from the server 130 in the form of an image through an image update process.

The server 130 and the gateways 120 to 122 may be connected by wire or by wireless. For example, the server 130 and the gateways 120 to 122 may communicate with each other through Ethernet or Wireless Fidelity (Wi-Fi).

The gateways 120 to 122 and the ESLs 110 to 112 may be connected to each other by wireless. For example, the ESLs 110 to 112 and the gateways 120 to 122 may be connected to each other through ZigBee, Wi-Fi, or Ultra Wide Band (UWB) communication.

The ESLs 110 to 112 may periodically transmit alive signals to the server 130. The server 130 may determine whether the ESLs 110 to 112 are operated through the alive signals received from the ESLs 110 to 112.

The ESLs 110 to 112 have unique identifiers (IDs), respectively. The server 130 may use the IDs of the ESLs 110 to 112 as addresses when communicating with the ESLs 110 to 112.

The IDs may be set by a manager when the ESLs 110 to 112 are initially installed on the shelves of the store. The manager may assign the IDs to the ESLs 110 to 112 by using a hand-held device. The manager may register the IDs in the server 130.

When the IDs of the ESLs 110 to 112 are registered in the server 130, the manager may change images displayed on the ESLs 110 to 112 through the server 130. Additionally, the manager may transmit a command for controlling the ESLs 110 to 112 through the server 130 to the ESLs 110 to 112.

Figure 2:
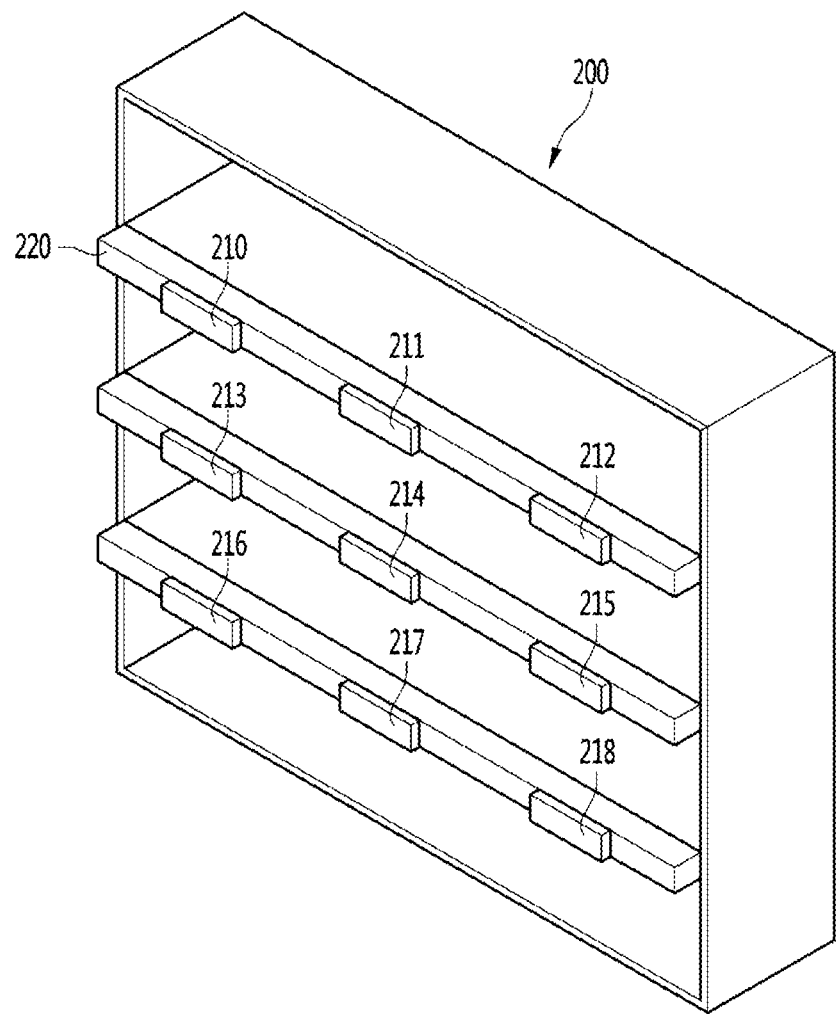
FIG. 2 is a view illustrating an example in which electronic shelf labels are arranged, according to an embodiment.

FIG. 2 is a view illustrating an example in which ESLs are arranged, according to an embodiment.

FIG. 2 shows a shelf 200 on which a plurality of ESLs 210 to 218 according to an embodiment are mounted. The shelf 200 may have a plurality of floors. A product may be put on each floor of the shelf. Label mounting tables 220 may be disposed on a lower front surface of each floor of the shelf 200. The plurality of ESLs 210 to 218 may be disposed on the label mounting tables 220.

Figure 3:
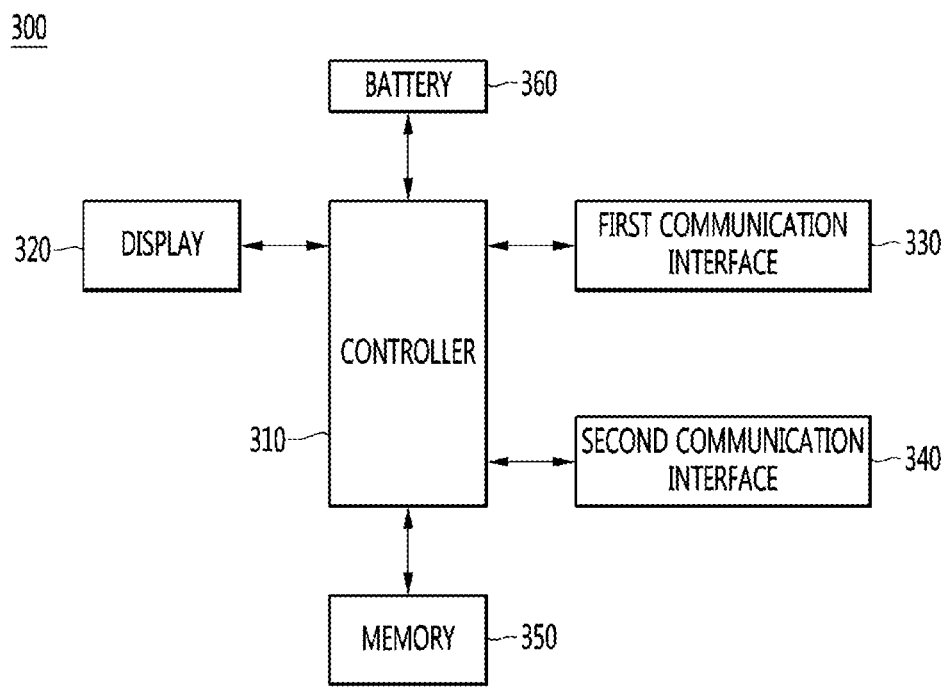
FIG. 3 is a schematic block diagram of an electronic shelf label according to an embodiment.

FIG. 3 is a schematic block diagram of the ESL according to an embodiment.

Referring to FIG. 3, an ESL 300 according to an embodiment may include a first communication interface 330. The first communication interface 330 may be disposed on a circuit board. The first communication interface 330 may be a wired/wireless communication interface capable of receiving product information from the server, the gateway, or the router.

The ESL 300 according to an embodiment may include a second communication interface 340. The second communication interface 340 may be disposed on the circuit board. The second communication interface 340 may be a wired/wireless communication interface capable of receiving a control signal from an external electronic device (not shown). The external electronic device (not shown) may be a control device configured separately from the ESL 300.

The ESL 300 according to an embodiment may include a display 320. The display 320 may output product information, for example, a price, a product image, discount information, and a barcode, in the form of an image through an image update process. For example, the ESL 300 may include a BCD or an EPD.

The ESL 300 according to an embodiment may include a controller 310. The controller 310 may be disposed on the circuit board. The controller 310 may be a micro control unit (MCU). The controller 310 may control a communication function, a display control function, an information storage function, or the like, which is necessary for the overall operation of the ESL 300, based on data or commands provided from the server, the gateway, or the router.

The ESL 300 according to an embodiment may include a memory 350. The memory 350 may be disposed on the circuit board. The memory 350 may store the ID of the ESL 300 and a video or image to be displayed on the ESL 300.

The ESL 300 according to an embodiment may include a battery 360. The battery 360 may supply power to the display 320, the first communication interface 330, the second communication interface 340, and the like. Additionally, the battery 360 may be a rechargeable battery or a non-rechargeable battery and may be disposed in the ESL 300 or may be disposed in the form of a power receiving unit that is supplied with external power.

However, the ESL 300 according to an embodiment uses an expensive MCU, which may cause a rise in product price. Additionally, in the case of the ESL 300 according to an embodiment, the number of channels communicating with the server increases as the number of ESLs in the ESL system increases. If the number of channels increases, the frequency of occurrence of communication collision increases, thus increasing an error occurrence rate, and an update speed for image output is delayed.

Figure 4:
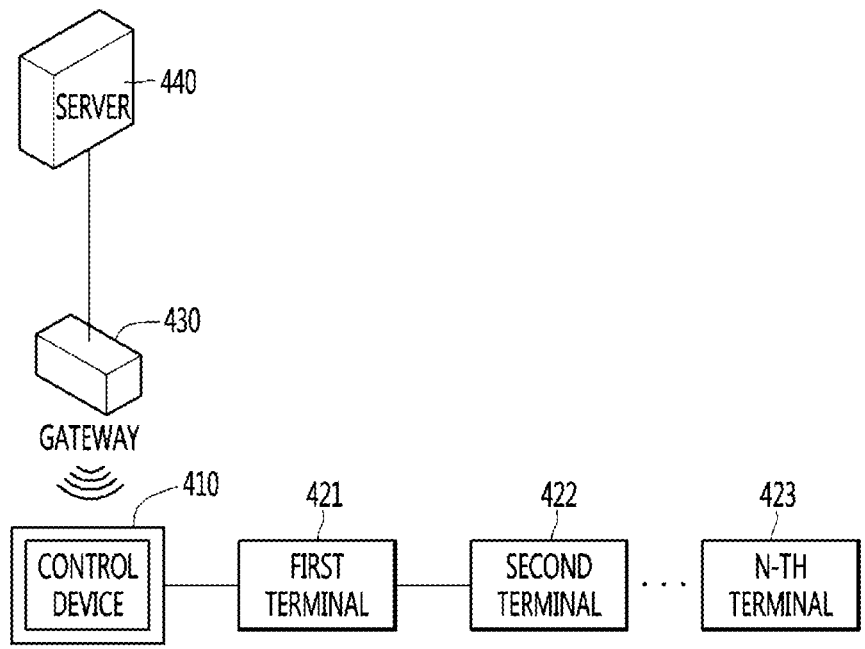
FIG. 4 is a schematic view of a system including an electronic shelf label, according to another embodiment.

FIG. 4 is a schematic view of a system including an ESL, according to another embodiment.

Referring to FIG. 4, the ESLs may also be referred to as electronic shelf label terminals, product tags, ESL terminals, terminals, or control devices. In particular, the ESL according to another embodiment may be divided into a control device 410 and terminals 421 to 423. More specifically, the control device 410 may be a master device that controls the terminals 421 to 423. The terminals 421 to 423 may be a slave device that is controlled by the control device 410. Additionally, although the ESL is divided into the control device and the terminals, embodiments of the present disclosure are not limited thereto. The control device and the terminals may be integrally coupled or may be configured as a single device capable of performing the same operation.

The terminals 421 to 423 may be mounted on shelves of stores such as large-sized shopping malls and general stores and display product information such as price. Additionally, one or more terminals 421 to 423 may be controlled by the single control device 410. That is, the first terminal to the n-th terminal (n is a natural number greater than or equal to 2) may receive a power supply signal, a pulse width modulation (PWM) signal, and a display signal from the single control device 410 and display an image.

The control device 410 may control the one or more terminals 421 to 423. Additionally, the control device 410 communicates with the server 440 through one or more gateways 430. Accordingly, in another embodiment, the number of gateways, coordinates (not shown), or routers (not shown) connected to the server may decrease, thus reducing the manufacturing cost of the ESL system. Additionally, in another embodiment, the communication channels communicating with the server may decrease, thus reducing the frequency of occurrence of communication collision and an error occurrence probability. Additionally, in another embodiment, available communication channels increase, and thus, communication performance may be improved and the image output update speed of the terminal may increase.

The server 440 is connected to a console (not shown). The console means a device including a user interface for managing the system. The server 440 may receive a user command through the console. Additionally, the gateway 430 and the control device 410 of the ESL may receive a user command through the console. In other words, a user may control the control device 410 of the ESL, the gateway 430, and the server 440.

The server 440 may transmit, to the control device 410 of the ESL, product information to be displayed on the terminals 421 to 423 of the ESL, for example, image data such as a price, a product image, discount information, and a barcode. The control device 410 may provide a power supply signal, a PWM signal, and a display signal to the one or more terminals 421 to 423 based o the image data received from the server 440. The one or more terminals 421 to 423 may output an image through an image update process based on the power supply signal, the PWM signal, and the display signal.

The server 440 and the gateway 430 may be connected by wire or by wireless. For example, the server 440 and the gateway 430 may communicate with each other through Ethernet or Wi-Fi.

The gateway 430 and the control device 410 of the ESL may be connected to each other by wireless. For example, the control device 410 and the gateway 430 may be connected to each other through ZigBee, Wi-Fi, or UWB communication.

The control device 410 of the ESL may periodically transmit an alive signal to the server 440. The server 440 may determine whether the control device 410 or the terminals 421 to 423 are operated through the alive signal received from the control device 410 of the ESL.

The ESL has a unique ID. More specifically, the control device 410 of the ESL may include a first unique ID. Additionally, the terminals 421 to 423 of the ESL may include second unique IDs. The server 440 may use the first unique ID as an address when communicating with the control device 410. The first unique ID may be set by a manager when the control device 410 is initially installed on the shelf of the store. The manager may assign the first unique ID to the control device 410 by using a hand-held device. The manager may register the first unique ID in the server 440. Additionally, the control device 410 may use the second unique IDs as addresses when controlling the terminals 421 to 423. The second unique IDs may be set by the manager when the terminals 421 to 423 are initially installed on the shelf of the store. The manager may assign the second unique IDs to the terminals 421 to 423 by using setup switches of the terminals 421 to 423. The manager may register the second unique IDs in the server 440 or the control device 410.

When the unique IDs of the ESL are registered in the server 440 or the control device 410, the manager may change images displayed on the terminals 421 to 423 through the server 440. More specifically, the manager may transmit a command for controlling the terminals 421 to 423 through the server 440 to the control device 410. The control device 410 may control the terminals 421 to 423 based on the control command received from the server 440.

Figure 5:
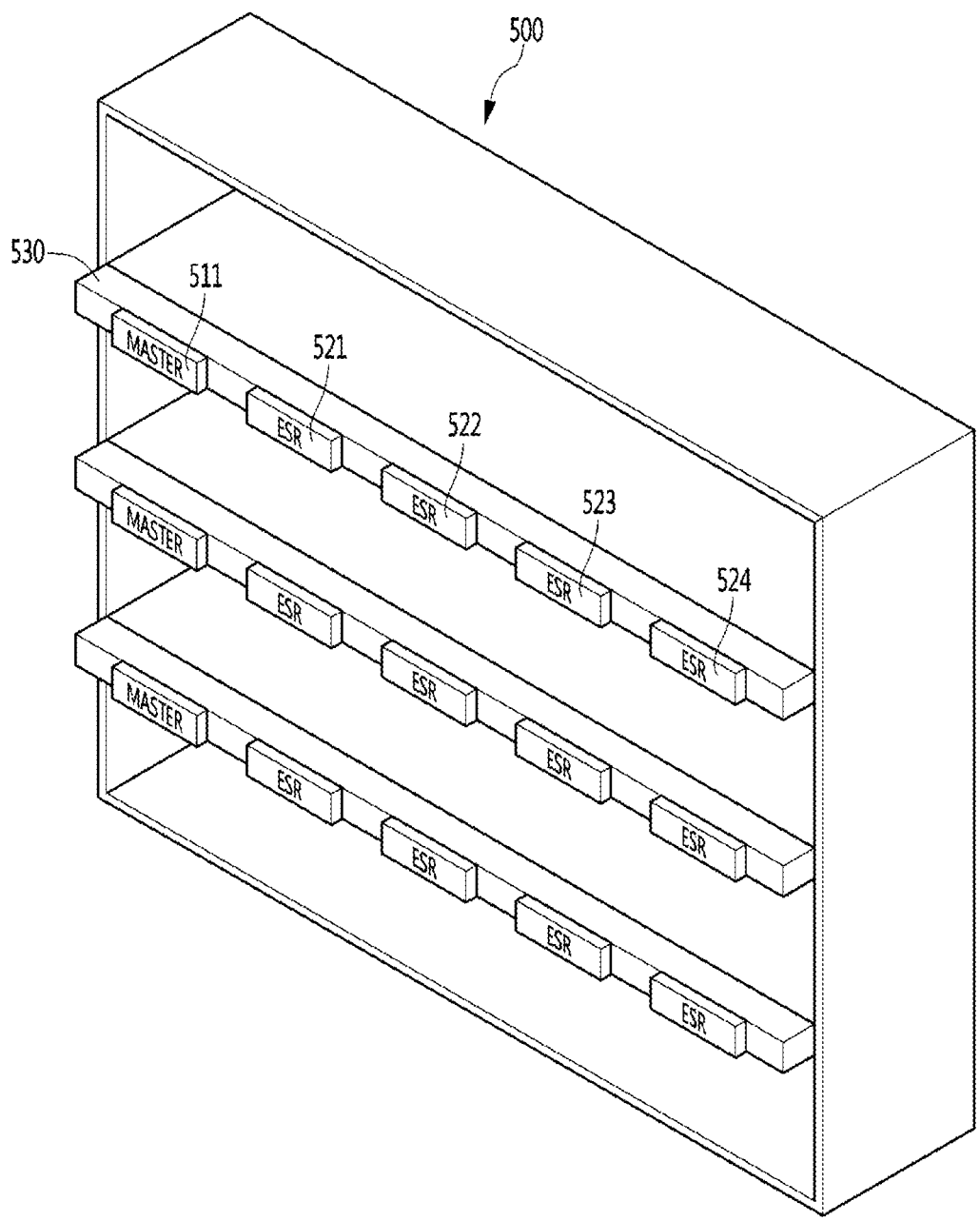
FIG. 5 is a view illustrating an example in which electronic shelf labels are arranged, according to another embodiment.

FIG. 5 is a view illustrating an example in which ESLs are arranged, according to another embodiment.

FIG. 5 shows a shelf 500 on which a plurality of ESLs according to another embodiment are mounted. The shelf 500 may have a plurality of floors. A product may be put on each floor of the shelf. A label mounting table 530 may be disposed on a lower front surface of each floor of the shelf 500. The ESL may include a control device 511, which is a master device, and one or more terminals 521 to 524, which are slave devices. Additionally, the control device 511 may be disposed on side of the label mounting table 530. The one or more terminals 521 to 524 may be arranged in a row based on the control device 511.

FIG. 6 is a signal flow diagram of a control device and a plurality of terminals, according to another embodiment.

Referring to FIG. 6, a control device 611 may supply power to first to fourth terminals 621 to 624 (S105). In this case, the first to fourth terminals 621 to 624 are supplied with power but are not driven because driving switches, which are driving power paths, are in an off-state.

The control device 611 may provide a PWM signal to the first to fourth terminals 621 to 624. The PWM signal may be a pulse width modulation signal. The control device 611 may adjust a duty ratio of the PWM signal. The control device 611 may adjust the duty ratio of the PWM signal to selectively drive the terminals to be controlled among one or more terminals. More specifically, the control device 611 may set a corresponding duty ratio to each of the plurality of terminals, adjust the duty ratio of the PWM signal, and provide the PWM signal at a corresponding duty ratio to the terminal to be controlled. For example, as shown in FIG. 6, the control device 611 may provide the PWM signal at the duty ratio for driving the third terminal 623 among the first to fourth terminals 621 to 624.

The plurality of terminals may drive power for outputting the image based on the PWM signal (S115). A case in which each terminal selectively operates based on the PWM signal according to the set duty ratio will be described below. For example, the third terminal 623 among the first to fourth terminals 621 to 624 may turn on the driving switch and provide driving power to the display unit, based on the PWM signal provided from the control device 611.

The control device 611 may provide a display signal to the first to fourth terminals 621 to 624. The display signal may include one or more signals according to the configuration of the display unit. For example, when the display unit is an EPD, the display signal may include a gate signal and a source signal.

The terminal to be controlled among the plurality of terminals may output an image based on the display signal. For example, the third terminal 623 among the first to fourth terminals 621 to 624 may output an image on the display unit based on the provided display signal.

FIG. 7 is a view illustrating a connection structure of a control device and a plurality of terminals, according to another embodiment.

Referring to FIG. 7, a control device 711 according to another embodiment may be electrically connected to one or more terminals. More specifically, the control device 711 may connect a first signal sig1 to one or more terminals through a first connection line. The first signal sig1 may be power. More specifically, the first signal sig1 may include driving power for supplying power to the display unit or reference power for reference voltage distribution. Only one first connection line is illustrated, but embodiments of the present disclosure are not limited thereto. A plurality of first connection lines may be provided. For example, the control device 711 may be connected to the first to fourth terminals 721 to 724 and the first connection line and supply the first signal sig1 including the driving power or the reference power.

Additionally, the control device 711 may connect a second signal sig2 to one or more terminals through a second connection line. The second signal sig2 may be a PWM signal. More specifically, the second signal sig2 may be the above-described PWM signal, the duty ratio of which is adjusted. More specifically, the second signal sig2 may be used to select the terminal to be driven. Only one second connection line is illustrated, but embodiments of the present disclosure are not limited thereto. A plurality of second connection lines may be provided. For example, the control device 711 may be connected to the first to fourth terminals 721 to 724 and the second connection line and supply the second signal sig2 including the PWM signal.

Additionally, the control device 711 may connect a third signal sig3 to one or more terminals through a third connection line. The third signal sig3 may be a data signal. More specifically, the third signal sig3 may be the above-described data signal for outputting an image on the display unit. More specifically, a communication scheme of the third signal sig3 may be a Serial Peripheral Interface (SPI) communication scheme. That is, the communication scheme may include four connection pins, and each connection pin may provide a signal by each connection line. For example, the SPI communication may include a chip select (CS) pin, a master out slave in (MOSI) pin, a master in slave out (MISO) pin, and a clock (CLK) pin. Therefore, only one third connection line is illustrated, but embodiments of the present disclosure are not limited thereto. A plurality of third connection lines may be provided. For example, the control device 711 may be connected to the first to fourth terminals 721 to 724 and the third connection line and supply the third signal sig3 including the display signal through the SPI communication scheme.

Figure 8:
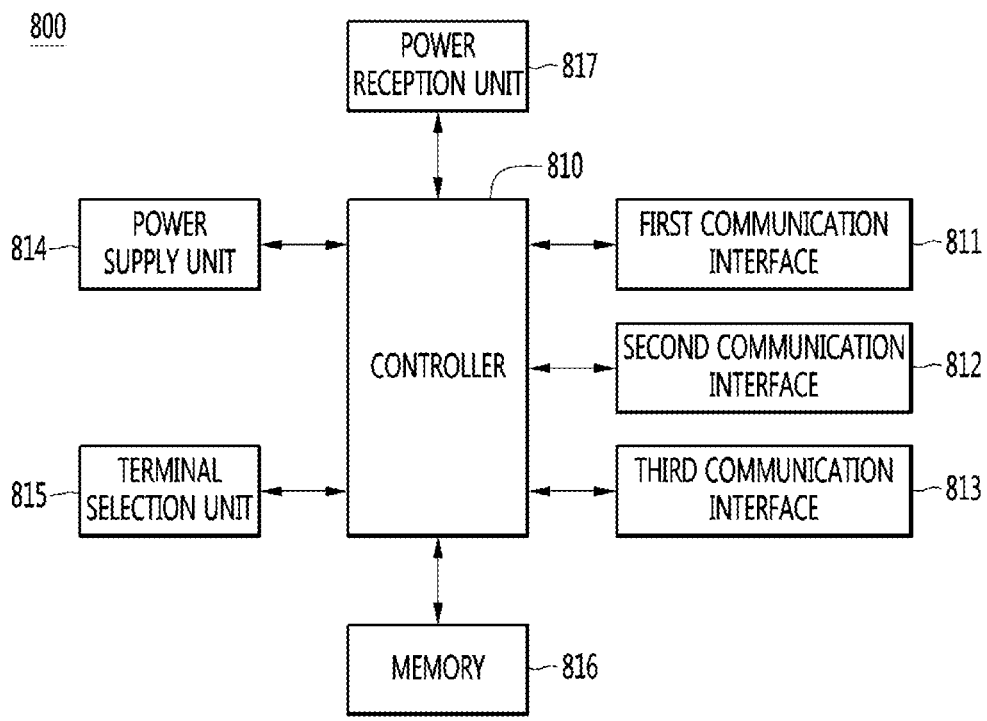
FIG. 8 is a schematic block diagram of a control device according to another embodiment.

FIG. 8 is a schematic block diagram of a control device according to another embodiment.

Referring to FIG. 8, a control device 800 of an ESL according to another embodiment may include a first communication interface 811. The first communication interface 811 may be disposed on a circuit board. The first communication interface 811 may be a wired/wireless communication interface capable of receiving product information from a server, a gateway, or a router.

The control device 800 according to another embodiment may include a second communication interface 812. The second communication interface 812 may be disposed on the circuit board. The second communication interface 812 may be an SPI communication interface capable of transmitting a display signal to one or more terminals. The display signal provided in the second communication interface 812 may be the third signal sig3 described above.

The control device 800 according to another embodiment may include a third communication interface 813. The third communication interface 813 may be disposed on the circuit board. The third communication interface 813 may be a wired/wireless communication interface capable of receiving a control signal from an external electronic device (not shown). The external electronic device (not shown) may be a control device configured separately from the ESL.

The control device 800 according to another embodiment may not include a display. Additionally, the control device 800 may include a display (not shown) if necessary. The display (not shown) may output product information, for example, a price, a product image, discount information, and a barcode, in the form of an image through an image update process. For example, the control device 800 may include a BCD or an EPD.

The control device 800 according to another embodiment may include a controller 810. The controller 810 may be disposed on the circuit board. The controller 810 may be an MCU. The controller 810 may control a communication function, a display control function, an information storage function, or the like, which is necessary for the overall operation of the control device 800 and one or more terminals, based on data or commands provided from the server, the gateway, or the router. Additionally, the controller 810 may adjust a duty ratio of a PWM signal provided from a terminal selection unit 815 so as to select a terminal to output an image.

The control device 800 according to another embodiment may include a memory 816. The memory 816 may be disposed on the circuit board. The memory 816 may store a first unique ID of the control device 800, second unique IDs of one or ore terminals, and a video or image to be displayed on the control device 800 or the terminal.

The control device 800 according to another embodiment may include a power reception unit 817. The power reception unit 817 may supply power to the display, the first communication interface 811, the second communication interface 812, the third communication interface 813, the terminal selection unit 815, the power supply unit 814, and the like. Additionally, the power reception unit 817 may be a rechargeable battery or a non-rechargeable battery and may be disposed in the ESL or may be disposed in the form of a power receiving unit that is supplied with external power.

The control device 800 according to another embodiment may include a power supply unit 814. The power supply unit 814 may supply power to one or more terminals connected to the control device 800, based on the power supplied from the power reception unit 817. The power supplied from the power supply unit 814 may be the first signal sig1 described above.

The control device 800 according to another embodiment may include the terminal selection unit 815. The terminal selection unit 815 may select a terminal to be controlled among one or more terminals. More specifically, the terminal selection unit 815 may provide a PWM signal to each terminal by setting a duty ratio identified by each terminal. The PWM signal provided from the terminal selection unit 815 may be the second signal sig2 described above.

Figure 9:
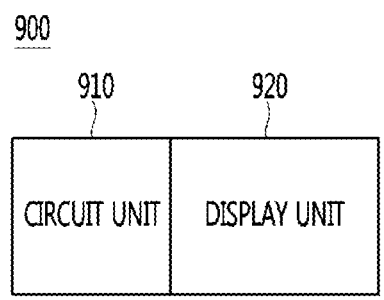
FIG. 9 is a schematic block diagram of a terminal according to another embodiment.
Figure 10:
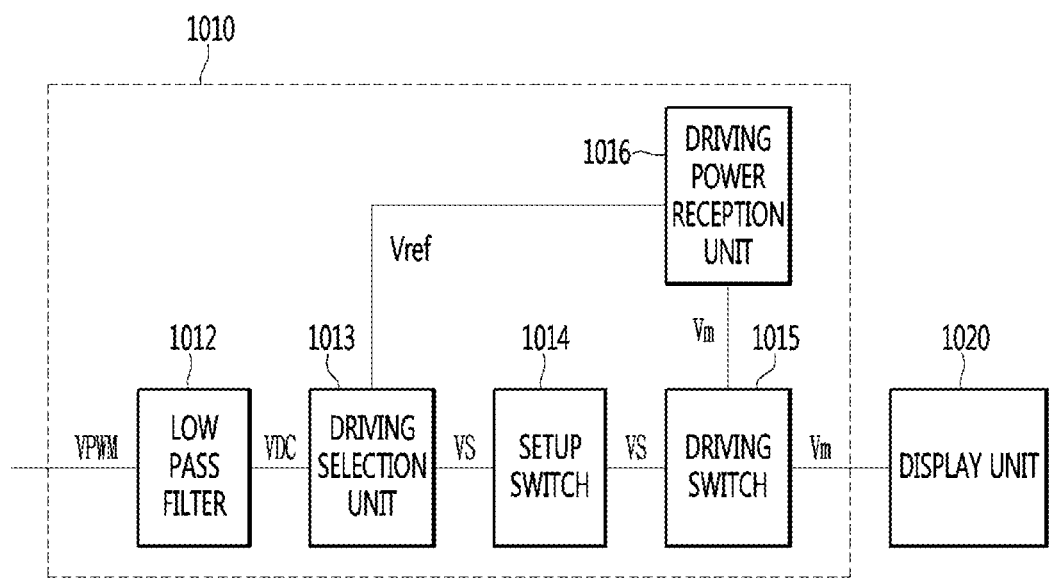
FIG. 10 is a view illustrating a circuit unit of the terminal of FIG. 9.

FIG. 9 is a schematic block diagram of a terminal according to another embodiment, and FIG. 10 is a view illustrating a circuit unit of the terminal of FIG. 9.

Referring to FIG. 9, a terminal 900 in an ESL according to another embodiment may include a circuit unit 910 for driving a display unit 920. The circuit unit 910 may determine whether to drive the terminal based on the PWM signal that is the second signal sig2 of the control device. More specifically, the circuit unit 910 may determine whether to control or drive the terminal based on the PWM signal, the duty ratio of which is set. Additionally, when determined to control or drive the terminal, the circuit unit 910 may provide driving power to the display unit 920. The display unit 920 may output an image based on the driving power that is the first signal sig1. Additionally, the display unit 920 may update an image to be output, based on the display signal that is the third signal sig3 from the control device.

A circuit unit 1010 of the terminal will be described in more detail with reference to FIG. 10.

The circuit unit 1010 may include a low pass filter 1012. The low pass filter 1012 may generate a DC voltage VDC based on a PWM signal VPWM provided from the control device. The generated DC voltage VDC may be a voltage having a constant level according to the duty ratio of the PWM signal VPWM. More specifically, as the duty ratio of the PWM signal VPWM increases, a voltage level of the DC voltage VDC may increase. In relation to the principle that the low pass filter 1012 generates the PWM signal as the DC voltage VDC, the PWM signal may be divided into a plurality of RF signals by Fourier While passing through the low pass filter, an RF signal having a frequency component may be filtered, and a DC voltage that is an RF signal having a DC component may pass. At this time, the DC voltage may be proportional to the magnitude and the duty ratio of the PWM signal.

The circuit unit 1010 may include a driving selection unit 1013. The driving selection unit 1013 may output a selection voltage VS based on the DC voltage VDC provided from the low pass filter 1012 and the reference voltage Vref provided from the driving power reception unit 1016. More specifically, the driving selection unit 1013 may determine the voltage level of the DC voltage VDC by comparing the DC voltage VDC with the division voltage distributed from the reference voltage Vref. The driving selection unit 1013 may provide the selection voltage VS based on the voltage level of the DC voltage VDC. More specifically, the driving selection unit 1013 may include a plurality of selection voltages and output a selection voltage VS set according to the voltage level of the DC voltage VDC.

The circuit unit 1010 may include a setup switch 1014. The setup switch 1014 may be used as a second unique ID of the terminal. That is, the setup switch 1014 may distinguish a terminal controlled by the control device. More specifically, the setup switch 1014 may be identified by the control device and may be differently set according to the terminal to be controlled. Additionally, when the received selection voltage VS is a selection voltage set to the terminal to be controlled, the setup switch 1014 may provide the received selection voltage VS to the driving switch 1015. That is, when the received selection voltage VS does not correspond to the terminal to be controlled by the control device, the setup switch 1014 does not provide the selection voltage VS to the driving switch 1015.

The circuit unit 1010 may include a driving power reception unit 1016. The driving power reception unit 1016 may receive driving power that is the first signal sig1 of the control device. The driving power reception unit 1016 may provide the reference voltage Vref to the driving selection unit 1013. Additionally, the driving power reception unit 1016 may provide the driving voltage Vm to the driving switch 1015 based on the driving power. The driving voltage Vm may include a voltage level capable of driving the display unit 1020.

The circuit unit 1010 may include a driving switch 1015. The driving switch 1015 may provide the driving voltage Vm to the display unit 1020 based on the selection voltage VS provided from the setup switch 1014 and the driving voltage Vm of the driving power reception unit 1016. That is, the driving switch 1015 may be turned on when the selection voltage VS is received, so that the driving voltage Vm of the driving power reception unit 1016 is provided to the display unit 1020.

Therefore, the embodiment may provide an ESL that can be driven, without MCUs in the plurality of ESLs. Additionally, the embodiment may provide an ESL having an improved image output speed. Additionally, the embodiment may provide an ESL, a manufacturing cost of which is reduced because an expensive MCU is not used. According to an embodiment, one or more ESLs may be controlled by one control device.

Figure 11:
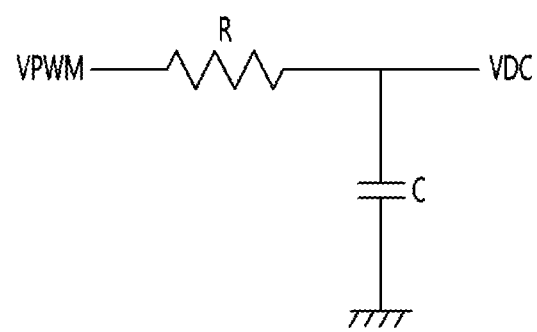
FIG. 11 is a view illustrating a low pass filter of the circuit unit of FIG. 10.

FIG. 11 is a view illustrating the low pass filter of the circuit unit of FIG. 10.

Referring to FIG. 11, the low pass filter of the circuit unit may include a resistor R. The resistor R may have one end receiving the PWM signal VPWM and the other end receiving the DC voltage VDC. The other end of the resistor R may be connected to one end of a capacitor C.

The low pass filter of the circuit unit may include the capacitor C. One end of the capacitor C may be connected to the other end of the resistor R, and the other end of the capacitor C may be connected to a ground GND.

Figure 12:
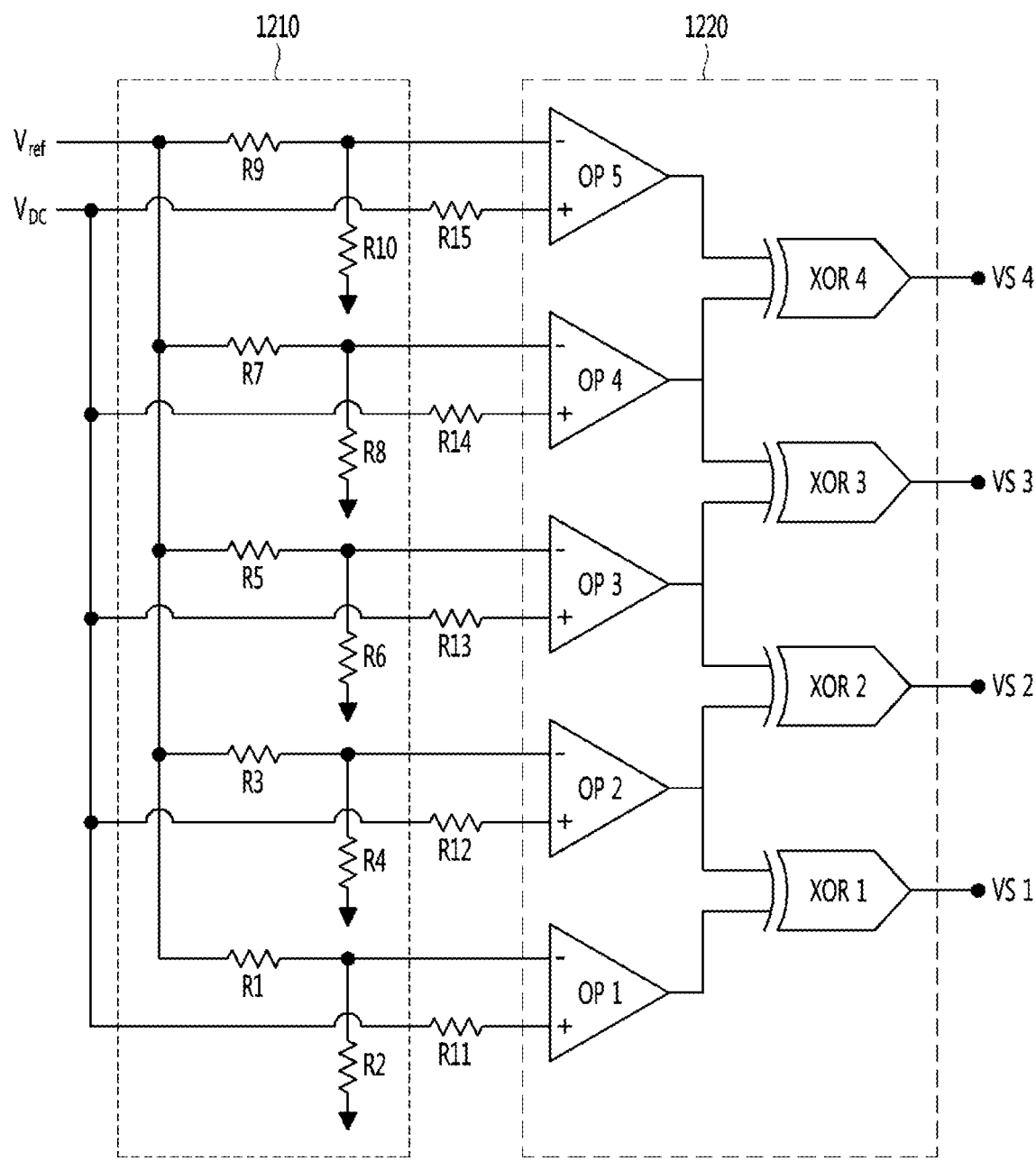
FIG. 12 is a view illustrating a driving selection unit of the circuit unit of FIG. 10.

FIG. 12 is a view illustrating the driving selection unit of the circuit unit of FIG. 10.

Referring to FIG. 12, the driving selection unit of the circuit unit may include a voltage division unit 1210. The voltage division unit 1210 may generate a plurality of reference voltages by dividing the reference voltage Vref provided from the driving power reception unit by using a plurality of resistors. For example, it is assumed that four terminals are controlled by the control device. In this case, the voltage division unit 1210 may generate reference voltages having five levels by dividing the reference voltage Vref by using first to tenth resistors R1 to R10. More specifically, when 5 V is provided as the reference voltage Vref, since the first resistor R1 is 4 kΩ and the second resistor R2 is 1 kΩ, the reference voltage of 1 V may be generated. Since the third resistor R3 is 3 kΩ and the fourth resistor R4 is 2 kΩ, the reference voltage of 2 V may be generated. Since the fifth resistor R5 is 2 kΩ and the sixth resistor R6 is 3 kΩ, the reference voltage of 3 V may be generated. Since the seventh resistor R7 is 1 kΩ and the eighth resistor R8 is 4 kΩ, the reference voltage of 4 V may be generated. Since the ninth resistor R9 is about 0 S2 and the tenth resistor R10 is 5 kΩ, the reference voltage of 5 V may be generated.

The driving selection unit of the circuit unit may include a selection voltage generation unit 1220. The selection voltage generation unit 1220 may generate one or more selection voltages based on the DC voltage VDC provided from the low pass filter and the plurality of reference voltages provided from the voltage division unit 1210. More specifically, the selection voltage generation unit 1220 may include a plurality of operational amplifiers OP1 to OP5. In the plurality of operational amplifiers OP1 to OP5, the DC voltage VDC provided from the low pass filter may be applied to the positive terminals, and the reference voltages having different levels by the voltage division unit 1210 may be applied to the negative terminals. Each of the plurality of operational amplifiers OP1 to OP5 may compare the DC voltage VDC with the reference voltage and output a high level signal when the DC voltage is higher than the reference voltage. Each of the plurality of operational amplifiers OP1 to OP5 may compare the DC voltage VDC with the reference voltage and output a low level signal when the DC voltage is lower than the reference voltage. Additionally, the selection voltage generation unit 1220 may include a plurality of exclusive OR (XOR) gates XOR1 to XOR4. Each of the plurality of XOR gates XOR1 to XOR4 may receive outputs of two adjacent operational amplifiers among the plurality of operational amplifiers OP1 to OP5. Each of the plurality of XOR gates XOR1 to XOR4 may output a selection voltage having a high level when one of the outputs of the two operational amplifiers is a high level signal and the other output is a low level signal. Each of the plurality of XOR gates XOR1 to XOR4 may not output a selection voltage when the outputs the two operational amplifiers are all a high level signal or a low level signal. For example, it may be assumed that a second selection voltage VS2 must be output so as to control the second terminal among the first to fourth terminals. To this end, the DC voltage VDC may be a voltage of 2.5 V. When the voltage division unit 1210 divides the reference voltage Vref of 5 V into reference voltages of 1 V, 2 V, 3 V, 4 V, and 5 V, the first to fifth operational amplifiers OP1 to OP5 may compare the reference voltages with the DC voltage VDC of 2.5 V. The first and second operational amplifiers OP1 and OP2 may output high level signals, and the third to fifth operational amplifiers OP3 to OP5 may output low level signals. In this case, since the input signals of the first XOR gate XOR1 are all a high level signal, the first XOR gate XOR1 may not output the selection voltage, or may output a low level signal. Since the input signals of the third XOR gate XOR1 and the fourth XOR gate XOR4 are all a low level signal, the third XOR gate XOR3 and the fourth XOR gate XOR4 may not output the selection voltage, or may output a low level signal. Since the input of one terminal of the second XOR gate XOR2 is a high level signal and the input of the other terminal of the second XOR gate XOR2 is a low level signal, the second XOR gate XOR2 may output a second selection voltage VS2. The second terminal may be controlled or driven based on the second selection voltage VS2 output from the second XOR gate XOR2.

Figure 13:
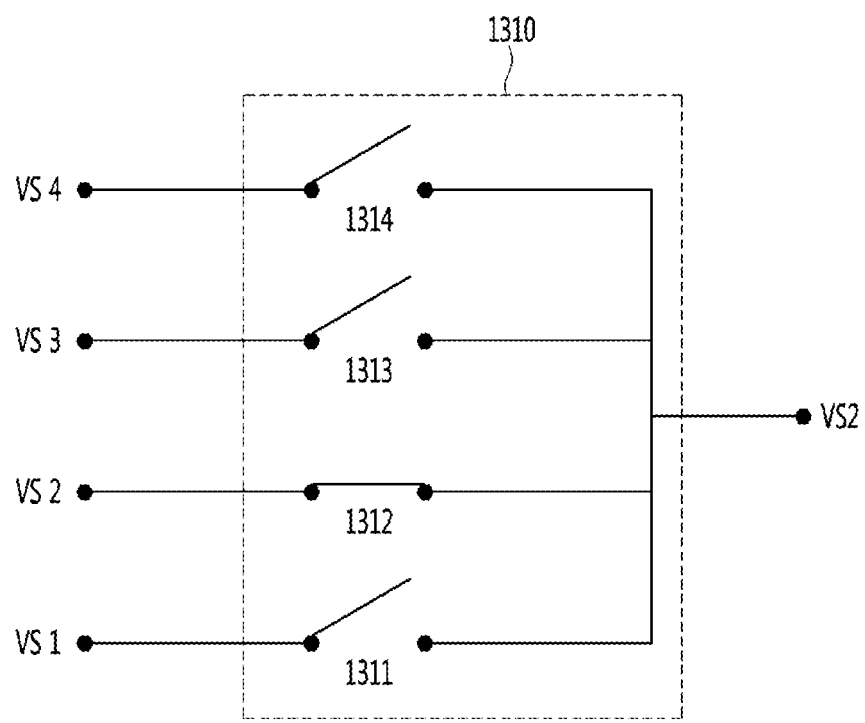
FIG. 13 is a view illustrating a setup switch of the circuit unit of FIG. 10.

FIG. 13 is a view illustrating the setup switch of the circuit unit of FIG. 10.

Referring to FIG. 13, the setup switch 1310 of the circuit unit may be used as second unique IDs of a plurality of terminals. More specifically, the setup switch 1310 may include a plurality of switches 1311 to 1314. In order to provide the set selection voltage to the set terminal, only the set switches among the plurality of switches 1311 to 1314 may be turned on, and the other switches may be turned off. For example, the first to fourth terminals may be set to drive the display units when the first to fourth selection voltages are provided. In order to drive the display unit of the second terminal, only the second switch 1312 in the setup switch 1310 of the second terminal may be turned on, and the other switches 1311, 1313, and 1314 may be turned off. In this regard, when the second selection signal VS2 is input, the second terminal may drive the display unit, but may not drive the display unit even when the first selection signal VS1 for controlling the first terminal, the third selection signal VS3 for controlling the third terminal, and the fourth selection signal VS4 for controlling the fourth terminal are input. Additionally, the setup switch 1310 may be a reed switch, but embodiments of the present disclosure are not limited thereto. The case where the setup switch 1310 is the reed switch will be described below.

Figure 14:
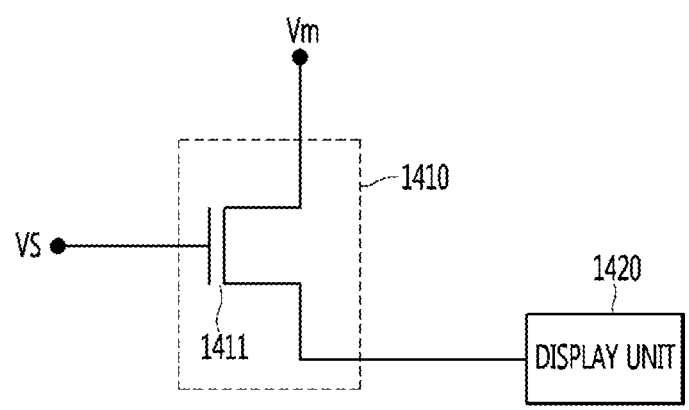
FIG. 14 is a view illustrating a driving switch of the circuit unit of FIG. 10.

FIG. 14 is a view illustrating the driving switch of the circuit unit of FIG. 10.

Referring to FIG. 14, the driving switch 1410 of the circuit unit may be a MEMS, a BJT, or a MOSFET. For example, when the driving switch 1410 is a MOSFET 1411, the selection voltage VS of the setup switch may be applied to a gate electrode of the driving switch 1410, the driving voltage Vm of the driving power reception unit may be applied to a drain electrode thereof, and a display unit 1420 may be connected to a source electrode thereof. That is, the driving switch 1410 may be turned on in response to the selection voltage, and provide the driving voltage Vm to the display unit 1420.

Figure 15A:
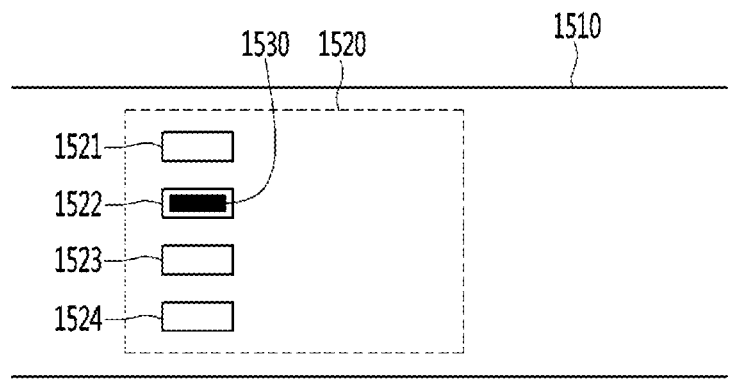
FIGS. 15A through 15C are views illustrating a setup switch of an electronic shelf label, according to another embodiment.
Figure 15B:
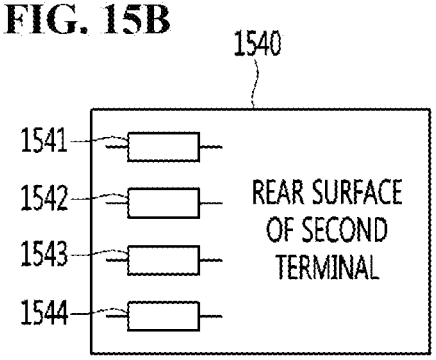
Figure 15C:
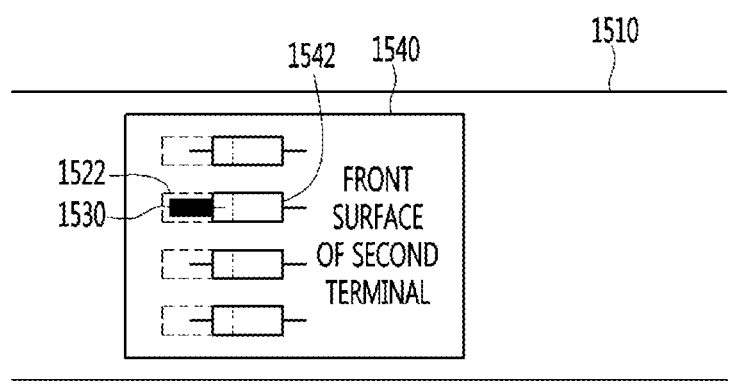

FIGS. 15A through 15C are views illustrating a setup switch of an ESL, according to another embodiment.

In FIGS. 15A through 15C, the setup switch of the terminal in the ESL according to another embodiment may be a reed switch. More specifically, a plurality of switches included in the setup switch may be reed switches. The reed switch may be turned on when a magnetic object such as a magnet approaches. Therefore, the setup switch may be turned on by arranging magnets in only the set reed switches among the plurality of reed switches so as to provide the set selection voltage to the set terminal. More specifically, referring to FIG. 15A, a holder 1520 in which a second terminal 1540 can be installed may be disposed in a label mounting table 1510. First to fourth magnet slots 1521 to 1524 may be disposed in the holder 1520 in correspondence to the first to fourth reed switches 1521 to 1524 of the second terminal 1540. The magnet 1530 may be disposed in the second magnet slot 1522. Referring to FIG. 15B, the second terminal 1540 may include a setup switch on a rear surface directly contacting the holder 1520. The setup switch may include first to fourth reed switches 1541 to 1544. Referring to FIG. 15C, the second terminal 1540 is mounted on the holder 1520 of the label mounting table 1510. The second terminal 1540 may turn on the second reed switch 1542 by the magnet 1530 disposed in the second magnet slot 1522.

FIG. 16 is a flowchart of an ESL method according to another embodiment.

Referring to FIG. 16, the setup switch of the plurality of terminals is set (S205). That is, only the set terminals may be driven or controlled by using the plurality of switches of the setup switch as the second unique IDs.

The control device supplies power to the plurality of terminals (S210). More specifically, the control device may provide the reference power or the driving voltage to the plurality of terminals.

The PWM signals corresponding to the terminals to be controlled in the control device may be provided to the plurality of terminals (S215). More specifically, the control device may provide the PWM signals, the duty ratio of which is set for each terminal to be controlled, to the plurality of terminals.

The power of the terminal to be controlled may be driven (S220). More specifically, the terminal may provide the driving voltage to the display unit based on the PWM signal, the duty ratio of which is set.

The control device provides the display signal to the plurality of terminals (S225). More specifically, the control device may provide the display signal to the plurality of terminals so as to update an image of the terminal to be controlled.

The terminal to be controlled may output an image (S230). More specifically, the terminal to be controlled among the plurality of terminals may output an updated image on the display unit based on the driving voltage and the display signal. Since the terminals that are not to be controlled among the plurality of terminals are not provided with the driving voltage, the updated image may be output on the display unit.

Accordingly, in another embodiment, the number of gateways, coordinates (not shown), or routers (not shown) connected to the server may decrease, thus reducing the manufacturing cost of the ESL system. Additionally, in another embodiment, the communication channels communicating with the server may decrease, thus reducing the frequency of occurrence of communication collision and an error occurrence probability. Additionally, in another embodiment, available communication channels increase, and thus, communication performance may be improved and the image output update speed of the terminal may increase.

The effects of the ESL, the ESL system, and the ESL method according to the present disclosure are as follows.

First, the present disclosure may provide the ESL, the ESL system, and the ESL method, capable of driving without MCUs in the plurality of ESLs.

Second, the present disclosure may provide the ESL, the ESL system, and the ESL method, capable of improving an image output speed.

Third, the present disclosure may provide the ESL, the ESL system, and the ESL method, capable of reducing the manufacturing cost.

Fourth, the present disclosure may provide the ESL, the ESL system, and the ESL method, capable of controlling one or more ESLs by one control device.

According to an embodiment, the above-described method may be embodied as a program and stored in a computer-readable recording medium. Examples of the computer-readable recording medium include ROM, RAM, CD-ROM, a magnetic tape, a floppy disk, an optical data storage device, and the like. If desired, the computer-readable recording medium may be realized in the form of a carrier wave (for example, a transmission over the Internet).

The computer-readable recording medium may also be distributed over network-coupled computer systems so that the computer-readable code is stored and executed in a distributed fashion. Also, functional programs, codes, and code segments for implementing the above-described method may be easily construed by programmers skilled in the art to which the present disclosure pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic shelf label system including a control device and a plurality of terminals, the control device comprising:
    a power supply unit configured to provide driving power to the plurality of terminals;
    a communication interface configured to provide a display signal to the plurality of terminals;
    a terminal selection unit configured to select a terminal to be controlled among the plurality of terminals; and
    a controller configured to control the terminal selection unit so as to select the terminal to be controlled and generate the display signal,
    wherein each terminal of the plurality of terminals comprises:
    a display unit configured to output an image based on the display signal and a driving voltage; and
    a circuit unit including a driving power reception unit that generates the driving voltage based on the driving power, and configured to provide the driving voltage to the display unit when a terminal to be controlled by the terminal selection unit is selected,
    wherein the circuit unit comprises:
    a low pass filter configured to output a direct current (DC) voltage based on a pulse width modulation (PWM) signal;
    a driving selection unit configured to output a selection voltage based on the DC voltage and a plurality of reference voltages;
    a driving switch configured to provide the driving voltage to the display unit based on the selection voltage; and
    a setup switch configured to transfer the selection voltage corresponding to the terminal to be controlled to the driving switch;
    wherein the driving power reception unit generates reference power based on the driving power,
    wherein the driving selection unit comprises a voltage division unit and a selection voltage generation unit,
    wherein the voltage division unit generates the plurality of reference voltages by voltage division based on the reference power, and
    wherein the selection voltage generation unit generates the selection voltage based on the DC voltage and the reference voltages.

2. The electronic shelf label system according to claim 1, wherein the terminal selection unit provides a pulse width modulation (PWM) signal to the plurality of terminals so as to select the terminal to be controlled.

3. The electronic shelf label system according to claim 2, wherein the terminal selection unit selects the terminal to be controlled by setting a duty ratio of the PWM signal.

4. An electronic shelf label method comprising:
setting a setup switch of a plurality of terminals;
supplying, by a control device, power to the plurality of terminals;
providing, by the control device, a pulse width modulation (PWM) signal corresponding to a terminal to be controlled to the plurality of terminals;
driving power of the terminal to be controlled, based on the PWM signal;
providing, by the control device, a display signal to the plurality of terminals; and
outputting an image to the terminal to be controlled, based on the display signal,
wherein the providing the PWM signal corresponding to the terminal to be controlled to the plurality of terminals comprises providing, by the control device, a PWM signal having a duty ratio set to each terminal to be controlled to the plurality of terminals,
wherein the plurality of terminals comprises a circuit unit configured to provide the driving voltage to the display unit when the terminal to be controlled by the control device is selected, and
wherein the circuit unit comprises:
a driving power reception unit configured to generate a driving voltage based on driving power provided by the control device;
a low pass filter configured to output a direct current (DC) voltage based on the PWM signal;
a driving selection unit configured to output a selection voltage based on the DC voltage and one or more reference voltages;
a driving switch configured to provide the driving voltage to the display unit based on the selection voltage; and
a setup switch configured to transfer the selection voltage corresponding to the terminal to be controlled to the driving switch,
wherein the driving power reception unit generates reference power based on the driving power,
wherein the driving selection unit comprises a voltage division unit and a selection voltage generation unit,
wherein the voltage division unit generates the plurality of reference voltages by voltage division based on the reference power, and
wherein the selection voltage generation unit generates the selection voltages based on the DC voltage and the plurality of reference voltages.

5. The electronic shelf label method according to claim 4, wherein the setup switch comprises a plurality of switches, and
only the switch set to the terminal to be controlled is turned on, and the other switches are turned off.

6. The electronic shelf label method according to claim 5, wherein the plurality of switches are reed switches.

7. The electronic shelf label method according to claim 4, wherein the low pass filter comprises a resistor and a capacitor.

8. The electronic shelf label method according to claim 4, wherein the selection voltage generation unit comprises:
a plurality of operational amplifiers configured to compare the DC voltage with the reference voltages, generate a high level signal when a level of the DC voltage is higher than a levels of the reference voltages, and generate a low level signal when the level of the DC voltage is lower the levels of the reference voltages; and
a plurality of XOR gates configured to generate the selection voltage when outputs of the operational amplifiers have different levels.

* * * * *